United States Patent Office 3,454,616
Patented July 8, 1969

3,454,616
METHOD FOR PREPARING MONO-METHYLDICHLOROSILANE
Kinji Ariga, Minoru Takamizawa, Haruo Harada, Akitoshi Komiya, Seiki Takaya and Mitsuo Umemura, Annakashi, Japan, assignors to Shin-Etsu Kagaku Kogyo Kabushiki Kaisha, Tokyo-to, Japan, a joint-stock company of Japan
No Drawing. Filed Jan. 9, 1967, Ser. No. 607,893
Claims priority, application Japan, July 25, 1966, 41/48,698
Int. Cl. C07f 7/16
U.S. Cl. 260—448.2　　　　　　　　4 Claims

ABSTRACT OF THE DISCLOSURE

A mixed gas of methylchloride and hydrogen chloride is brought into contact and react with a contact mass containing silicon, copper and nickel at a temperature of from 200 to 350° C. and the product is distilled to obtain monomethyldichlorosilsane.

---

This invention relates to improvements in the method for preparing monomethyldichlorosilane.

Although it is well known in the art that monomethyldichlorosilane is advantageous as the starting material for preparing water-repellent silicone oil and as the starting material for preparing so-called carbon-functional silane, in the present method of synthesizing methylsilane by the direct reaction between a contact-mass consisting of silicon and copper and methylchloride, the quantity of by-produced monomethyldichlorosilane is only 1–2 percents of the total quantity of the saline produced. When the reaction is effected at a higher temperature, for example at a temperature higher than 350° C. the quantity of the by-produced monomethyldichlorosilane can be increased to about 10%, but in this case the yield of dimethyldichlorosilane greatly decreases and instead the yield of monomethyltrichlorosilane which is not relatively valuable greatly increases, thus resulting in more disadvantageous condition from the stand-point of production engineering. It has also been proposed a method of increasing the yield of monomethyldichlorosilane in which hydrogen gas or a hydrogen chloride gas is incorporated into the reaction system, but this latter method does not result in a satisfactory result.

Accordingly, the principal object of this invention is to provide a novel method of preparing monomethyldichlorosilane at low cost and in a large quantity without accompanying previous difficulties mentioned above, and the invention is characterized by that a mixed gas of methyl chloride and hydrogen chloride is brought into contact with a contact-mass containing silicon, copper and nickel and the mixture is caused to react with the contact-mass at a temperature within a range of from 200° C. to 350° C.

More particularly, in the method of direct synthesis of methyldichlorosilane, the method of joint use of hydrogen chloride is already known in the art as taught by U.S. Patents Nos. 2,483,373 and 2,488,487, but nothing is mentioned in the former patent with regard to the formation of monomethyldichlorosilane whereas while the later patent point outs that monomethyldichlorosilane is formed together with the main reaction product, its yield is at most 16%. Further, in the latter case a large quantity of methyltrichlorosilane of less practical utility is produced as the main reaction product. Thus the methods disclosed in said two U.S. patents are not satisfactory for the production of monomethyldichlorosilane.

A method of preparing methyldichlorosilane with the joint use of hydrogen chloride and in the presence of a copper catalyst containing silver is also disclosed in U.S. Patent No. 3,109,014. From the stand-point of the composition of the product this method is far better than prior methods mentioned above, but this method is not yet perfectly satisfactory because it requires to utilize an expensive catalyst of copper-silver series. Further, the utilization of copper-nickel catalyst in the synthesis of these silanes is already known in the art, as for example, by U.S. Patent Nos. 2,380,995 and 2,380,998. However, the former patent does not relate to the preparation of monomethyldichlorosilane and although the latter patent relates to a method of preparing monomethyldichlorosilane with the addition of hydrogen gas, its yield is only about 15–17%.

However, in accordance with the novel method of this invention, not only monomethyldichlorosilane can be prepared at an extremely high yield but dimethyldichlorosilane or trichlorosilane which is valuable for the starting material for preparing semi-conductor silicon, carbon functional silane and the like can be obtained as the second main reaction product, and by suitably selecting the reaction condition it is possible to increase the yield of monomethyldichlorosilane to more than 35% and to decrease the yield of less valuable methyltrichlorosilane to less than 20%.

Although in this invention it is clear that the hydrogen chloride used together with methyl chloride acts as the source of hydrogen necessary for the synthesis of monomethyldichlorosilane, with regard to the function and mechanism it is supposed that nickel in the contact mass serves to make nearly equal the reaction velocity between methyl chloride and silicon and that between hydrogen chloride and silicon which are effected during this reaction and that effectively prevents the secondary pyrolysis of such silanes as monomethyldichlorosilane and trichlorosilane which contain hydrogen atoms thus effectively preserves hydrogen atoms. In fact, the conversion of hydrogen in this reaction amounts to more than 50%.

The ratio of copper and nickel utilized as the catalyst in carrying out this invention is preferably in the range of from 20:1 to 2:1, by weight, and it was found that a range of from 10:1 to 3:1 was most suitable. The catalyst may be either powder of copper-nickel alloy or a mixture consisting of copper powder and nickel powder.

These copper and nickel powders are mixed with silicon powder to form the contact mass utilized in this invention. Thus, for example the contact mass may be prepared by mixing together powders of copper, nickel and silicon in a ball mill. In this case, the total quantity of copper and nickel to be contained in the contact mass is from 5 to 15%, by weight, based on the total weight of the contact mass, preferably from 8 to 12%, by weight.

The reaction of this invention is carried out at a reaction temperature in a range of from 200° C. to 350° C. This is because that at temperatures below 200° C., the reaction velocity decreases rapidly whereas at temperatures above 350° C. decomposition reaction of monomethyldichlorosilane and trichlorosilane which are produced and decomposition reaction of methyl radicals increase greatly thus decreasing the yield of said silanes containing hydrogen with rapid increase in the yield of monomethyltrichlorosilane and silicon tetrachloride. Further, the activity of the catalyst rapidly degrades.

There is no particular limit on the molar ratio of the mixture of methyl chloride and hydrogen chloride to be passed through the contact mass. However, it is preferable to select this molar ratio to be in a range of from 4:1–0.2:1. Particularly, where it is desired to obtain large quantities of monomethyldichlorosilane and dimethyldichlorosilane, molar ratio of 3:1 to 2:1 is preferred whereas where it is desired to obtain large quantities of monomethyldichlorosilane and trichlorosilane, molar ratio of 1:1 to 0.2:1 is preferred.

Although addition of an inert gas such as nitrogen gas to the reactants is effective to convey the desired products out of the reaction system, such as addition is not always necessary.

The invention can be more fully understood from the following illustration examples, but it should be understood that the invention is not limited to these examples. In the following, the symbol Me designates a methyl radical and the composition of the silane in each example represents result of analysis by means of a gas chromatograph.

EXAMPLE 1

Nine parts by weight of silicon powder, 1 part by weight of copper foil powder and 0.2 part by weight of nickel foil powder were thoroughly mixed in a ball mill, 500 g. of this mixture was charged in a stainless reaction tube having an inner diameter of 4.5 cm. and a length of 100 cm. and a 1:1 (molar ratio) mixture of methyl chloride and dry hydrogen chloride was passed through the reaction tube to effect reaction at temperature between 280° C. and 290° C. to obtain condensed liquid having the following composition:

| | Percent |
|---|---|
| $HSiCl_3$ | 24.6 |
| $MeHSiCl_2$ | 32.0 |
| $SiCl_4$ | 0.7 |
| $MeSiCl_3$ | 18.1 |
| $Me_2SiCl_2$ | 8.5 |

EXAMPLE 2

Reaction was carried out under the same conditions as in Example 1 with a contact mass consisting of a mixture of 9 parts by weight of silicon powder, 1 part by weight of copper foil powder and 0.2 part by weight of reduced nickel powder and obtained condensed liquid having the following composition:

| | Percent |
|---|---|
| $HSiCl_3$ | 28.8 |
| $MeHSiCl_2$ | 36.4 |
| $SiCl_4$ | 1.4 |
| $MeSiCl_3$ | 16.1 |
| $Me_2SiCl_2$ | 2.4 |

EXAMPLE 3

A 2:1 (molar ratio) mixture of methylchloride and hydrogen chloride was reacted with the same contact mass as in Example 2 at reaction temperatures between 275° C. and 285° C, and obtained following products:

| | Percent |
|---|---|
| $HSiCl_3$ | 5.6 |
| $MeHSiCl_2$ | 33.2 |
| $SiCl_4$ | 0.5 |
| $MeSiCl_3$ | 23.0 |
| $Me_2SiCl_2$ | 24.8 |

EXAMPLE 4

A 1.5:1 (molar ratio) mixtures of methyl chloride and hydrogen chloride was passed to reaction temperatures of 290° C. to 300° C. over 500 g. of a contact mass consisting of 9 parts by weight of silicon powder, 1 part by weight of copper foil powder and 0.4 part by weight of nickel foil powder to obtain condenser liquid of the following composition:

| | Percent |
|---|---|
| $HSiCl_3$ | 9.5 |
| $MeHSiCl_2$ | 23.9 |
| $SiCl_4$ | 0.6 |
| $MeSiCl_3$ | 22.3 |
| $Me_2SiCl_2$ | 28.6 |

EXAMPLE 5

A 1:1 (molar ratio) gaseous mixture of methyl chloride and hydrogen chloride was passed over a contact mass consisting of 9 parts by weight of silicon powder, 1 part by weight of copper foil powder and 0.05 part by weight of nickel foil powder and the reaction was effected at temperatures of from 270 to 275° C. to obtain condensed liquid of the following composition:

| | Percent |
|---|---|
| $HSiCl_3$ | 21.5 |
| $MeHSiCl_2$ | 28.3 |
| $SiCl_4$ | 0.9 |
| $MeSiCl_3$ | 25.2 |
| $Me_2SiCl_2$ | 10.1 |

EXAMPLE 6

Over a contact mass consisting of 9 parts by weight of silicon powder, 1 part by weight of copper-nickel alloy foil powder (the ratio of copper to nickel being 10:1) was passed a 1:1 (molar ratio) gaseous mixture of methyl chloride and hydrogen chloride and the reaction was carried out at temperatures of from 290° C. to 300° C. to obtain condensed liquid of the following composition:

| | Percent |
|---|---|
| $HSiCl_3$ | 19.3 |
| $MeHSiCl_2$ | 29.2 |
| $SiCl_4$ | 2.3 |
| $MeSiCl_3$ | 23.0 |
| $Me_2SiCl_2$ | 10.3 |

EXAMPLE 7

A 3:1 (molar ratio) mixture of methyl chloride and hydrogen chloride was passed over a contact mass consisting of 9 parts by weight of silicon powder, 1 part by weight of copper foil powder and 0.2 part by weight of reduced nickel powder and the reaction was effected at temperatures of from 270° C. to 280° C. to obtain condensed liquid of the following composition:

| | Percent |
|---|---|
| $HSiCl_3$ | 6.2 |
| $MeHSiCl_2$ | 24.0 |
| $SiCl_4$ | 0.7 |
| $MeSiCl_3$ | 18.3 |
| $Me_2SiCl_2$ | 32.5 |

Following in this reaction a 0.75:1 (molar ratio) gaseous mixture of methyl chloride and hydrogen chloride was passed over the same contact mass and the reaction was continued at the same temperature to obtain condensed liquid of the following composition:

| | Percent |
|---|---|
| $HSiCl_3$ | 33.2 |
| $MeHSiCl_2$ | 34.8 |
| $SiCl_4$ | 1.1 |
| $MeSiCl_3$ | 14.6 |
| $Me_2SiCl_2$ | 2.0 |

EXAMPLE 8

10 kilograms of the contact mass having the same composition as in Example 7 was packed in a reaction tower provided with an agitator and made of a stainless tube having an inner diameter of 10 cm. and a length of 100 100 cm. and 17.5 kilograms of 1:1 (molar ratio) mixture of methylchloride and hydrogen chloride was passed through the reaction tower at a rate of 120 to 130 liters/hour to effect the reaction for 70 hours at reaction temperatures of 260° C. to 265° C. 21.3 kilograms of condensed liquid having the following composition was obtained, the conversion of hydrogen in this reaction being 52.3%.

| | Percent |
|---|---|
| $HSiCl_3$ | 28.6 |
| $MeHSiCl_2$ | 34.8 |
| $SiCl_4$ | 0.8 |
| $MeSiCl_3$ | 17.3 |
| $Me_2SiCl_2$ | 3.2 |

EXAMPLE 9

10 kilograms of a contact mass consisting of 9.15 parts by weight of silicon powder, 0.7 part by weight of copper foil powder and 0.15 part by weight of reduced nickel powder was packed in a reaction tower identical to that of Example 8 and 90.5 kilograms of a 1.5:1 (molar ratio) mixture of methylchloride and hydrogen chloride was passed through the reaction tower at reaction temperatures of from 250° C. to 260° C. and a flow rate of 120–140 liters per hour. The operation was continued for 315 hours by intermittently adding 1.5 kilograms of a contact mass consisting of 9.7 parts by weight of silicon powder, 0.23 part by weight of copper foil powder and 0.07 part by weight of reduced nickel powder, at an interval of 24 hours to obtain 106 kilograms of condensed liquid having the following composition, the conversion factor of hydrogen in this case being 67.8%.

| | Percent |
|---|---|
| $HSiCl_3$ | 13.8 |
| $MeHSiCl_2$ | 40.6 |
| $SiCl_4$ | 0.4 |
| $MeSiCl_3$ | 21.2 |
| $Me_2SiCl_2$ | 9.1 |

What we claim as new and desire to secure by Letters Patent of the United States is:

1. A method for preparing monomethyldichlorosilane which comprises contacting a gaseous mixture of methyl chloride and hydrogen chloride in molar ratio of from 4:1 to 0.2:1 with a contact mass consisting of silicon, copper and nickel wherein the ratio of copper to nickel ranges, in parts by weight, from 20:1 to 2:1 and wherein the total content of copper and nickel amounts to 5 to 15% by weight based on the weight of total contact mass, at a temperature of 200° C. to 350° C., and distilling the product to recover monomethyldichlorosilane.

2. The method according to claim 1 wherein the contact mass consists of 85 to 95% by weight of silicon and 5 to 15% by weight of copper-nickel alloy, the weight ratio of copper to nickel ranging from 20:1 to 2:1.

3. The method according to claim 1 wherein a gaseous mixture containing methychloride and hydrogen chloride in molar ratio of from 1:1 to 0.2:1 is used.

4. The method according to claim 1 wherein contact mass consists of 85 to 95% by weight of silicon and 5 to 15% by weight of a mixture of copper and nickel powders, the ratio of copper to nickel in said mixture ranging from 20:1 to 2:1.

References Cited

UNITED STATES PATENTS

| 2,887,502 | 5/1959 | Bluestein | 260—448.2 |
| 3,109,014 | 10/1963 | Tamura et al. | 260—448.2 |
| 3,155,698 | 11/1964 | Nitzsche et al. | 260—448.2 |

TOBIAS E. LEVOW, *Primary Examiner.*

J. P. PODGORSKI, *Assistant Examiner.*